(12) United States Patent
Uneura

(10) Patent No.: US 11,421,581 B2
(45) Date of Patent: Aug. 23, 2022

(54) ROTATING BODY AND TURBOCHARGER

(71) Applicant: IHI Corporation, Tokyo (JP)

(72) Inventor: Yutaka Uneura, Tokyo (JP)

(73) Assignee: IHI Corporation, Tokyo (JP)

(*) Notice: Subject to any disclaimer, the term of this patent is extended or adjusted under 35 U.S.C. 154(b) by 0 days.

(21) Appl. No.: 17/027,783

(22) Filed: Sep. 22, 2020

(65) Prior Publication Data

US 2021/0003068 A1 Jan. 7, 2021

Related U.S. Application Data

(63) Continuation of application No. PCT/JP2019/012834, filed on Mar. 26, 2019.

(30) Foreign Application Priority Data

May 24, 2018 (JP) .............................. JP2018-099433

(51) Int. Cl.
F04D 29/04 (2006.01)
F02B 37/00 (2006.01)
F02B 39/16 (2006.01)

(52) U.S. Cl.
CPC .............. *F02B 37/00* (2013.01); *F02B 39/16* (2013.01); *F04D 29/04* (2013.01)

(58) Field of Classification Search
CPC .......... F02B 37/00; F02B 39/16; F02B 39/00; F04D 29/04; F04D 29/266; F04D 29/284; F05D 2260/31; F05D 2220/40
USPC ....................................................... 60/605.1
See application file for complete search history.

(56) References Cited

U.S. PATENT DOCUMENTS 3,360,276 A * 12/1967 Peffer ................. B23B 31/4006
279/2.03
3,561,798 A * 2/1971 Redfern ................ F16D 1/0882
403/369
3,664,258 A * 5/1972 Vecchi .................... B29C 33/00
100/214

(Continued)

FOREIGN PATENT DOCUMENTS

CN 1212320 A 3/1999
CN 1263215 A 8/2000

(Continued)

OTHER PUBLICATIONS

Combined Chinese Office Action and Search Report dated Sep. 30, 2021 in Chinese Patent Appiication No. 201980026544.6, 7 pages.

(Continued)

*Primary Examiner* — J. Todd Newton
(74) *Attorney, Agent, or Firm* — Oblon, McClelland, Maier & Neustadt, L.L.P.

(57) ABSTRACT

Provided is a rotating body, including: a shaft; an impeller (compressor impeller) having an insertion hole, which passes through the impeller in an axial direction of the shaft and is configured to receive one end side of the shaft inserted therethrough; an axial-end hole, which is formed in the shaft, is opened at one end of the shaft, and extends to a radially inner side of the insertion hole in the axial direction of the shaft; a radial-expansion member arranged in the axial-end hole; and a tubular wall portion, which forms the axial-end hole, and is configured to press an inner peripheral surface of the insertion hole.

5 Claims, 7 Drawing Sheets

(56) References Cited

U.S. PATENT DOCUMENTS

| | | | | |
|---|---|---|---|---|
| 3,776,651 | A | * | 12/1973 | Peter .................. F16D 1/09 403/248 |
| 3,904,301 | A | * | 9/1975 | Schroeder ............. F04D 29/20 403/259 |
| 3,924,978 | A | * | 12/1975 | Loyd, Jr .................. F16D 1/05 418/60 |
| 4,095,908 | A | * | 6/1978 | Schafer ................. F16D 1/094 403/16 |
| 4,099,890 | A | * | 7/1978 | Murakami ............... F04D 7/04 277/350 |
| 4,147,468 | A | * | 4/1979 | Murakami ............... F04D 7/04 403/29 |
| 4,178,777 | A | * | 12/1979 | Ying ...................... H02K 55/04 464/98 |
| 4,538,965 | A | | 9/1985 | Ammann et al. |
| 4,745,998 | A | * | 5/1988 | Stilin ..................... F16D 1/09 192/74 |
| 4,890,946 | A | | 1/1990 | von Pragenau |
| 5,961,247 | A | * | 10/1999 | Gold ..................... F01D 5/025 403/369 |
| 6,039,497 | A | * | 3/2000 | Gullberg ................. F16B 3/06 403/16 |
| 6,074,119 | A | * | 6/2000 | Schlanger ............... F16B 2/14 403/297 |
| 6,499,969 | B1 | * | 12/2002 | Tombers ................. F01D 5/025 416/204 A |
| 8,425,189 | B2 | * | 4/2013 | Jaeger ................... F04D 29/20 415/216.1 |
| 9,334,895 | B2 | * | 5/2016 | Fabre ................... F16B 13/063 |
| 9,664,199 | B2 | * | 5/2017 | Ripattila ............... F04D 29/042 |
| 10,018,205 | B2 | * | 7/2018 | Pinkney ................ F16D 1/076 |
| 10,404,117 | B2 | * | 9/2019 | Crum ..................... H02K 1/28 |
| 2012/0151733 | A1 | * | 6/2012 | Fabre ..................... F16B 37/122 29/426.1 |
| 2015/0003906 | A1 | | 1/2015 | Johnson |
| 2015/0093247 | A1 | | 4/2015 | Asano et al. |
| 2015/0280501 | A1 | * | 10/2015 | Crum ..................... H02K 1/28 310/216.121 |
| 2016/0319879 | A1 | | 11/2016 | Johnson |
| 2021/0003068 | A1 | * | 1/2021 | Uneura .................. F02B 37/00 |

FOREIGN PATENT DOCUMENTS

| | | |
|---|---|---|
| CN | 2924129 Y | 7/2007 |
| CN | 105378301 A | 3/2016 |
| EP | 0 903 465 A1 | 3/1999 |
| JP | 34-017515 Y1 | 10/1959 |
| JP | 58-211597 A | 12/1983 |
| JP | 58-217702 A | 12/1983 |
| JP | 58-220901 A | 12/1983 |
| JP | 59-039701 U | 3/1984 |
| JP | 2-66726 U | 5/1990 |
| JP | 2009-209731 A | 9/2009 |
| JP | 2012-13196 A | 1/2012 |
| JP | 2012-092815 A | 5/2012 |
| JP | 2012-112416 A | 6/2012 |
| JP | 2013-163972 A | 8/2013 |
| WO | WO 2013/187403 A1 | 12/2013 |

OTHER PUBLICATIONS

International Search Report dated May 28, 2019 in PCT/JP2019/012834 filed Mar. 26, 2019 (with English Translation), 4 pages.

Office Action dated Apr. 20, 2022 in Chinese Patent Application No. 201980026544.6, with English translation.

"How to fix the anchor bolt", General Institute of Building Research, Ministry of Metallurgy Metallurgical Industry, Mar. 31, 1983, pp. 122-124.

"Design Manual for Cold Storage and Refrigeration", Commercial Division Design Institute, Agricultural Press, Oct. 31, 1991, pp. 655-657.

Office Action dated May 25, 2022 issued in counterpart DE Patent Application No. 11 2019 002 640.2.

* cited by examiner

ROTATING BODY AND TURBOCHARGER

CROSS REFERENCE TO RELATED APPLICATIONS

This application is a continuation application of International Application No. PCT/JP2019/12834, filed on Mar. 26, 2019, which claims priority to Japanese Patent Application No. 2018-099433, filed on May 24, 2018, the entire contents of which are incorporated by reference herein.

BACKGROUND ART

Technical Field

The present disclosure relates to a rotating body and to a turbocharger.

Related Art

In a turbocharger, for example, as disclosed in Patent Literature 1, a thrust collar, an oil thrower, a compressor impeller, and the like are sandwiched between a step surface formed on a shaft and a nut threadedly engaged with one end of the shaft. Rotational displacement of those members is suppressed by an axial force (fastening force) generated by the nut.

CITATION LIST

Patent Literature

Patent Literature 1: Japanese Patent Application Laid-Open No. JP 2013-163972

SUMMARY

Technical Problem

The axial force described above is managed, for example, based on torque for fastening the nut. The torque is affected by, for example, variation in friction. Thus, it is not easy to manage the torque. Therefore, it has not been easy to perform an operation of mounting the impeller to the shaft.

The present disclosure has an object to provide a rotating body and a turbocharger, which enable an impeller to be easily mounted to a shaft.

Solution to Problem

In order to achieve the above-mentioned object, according to one embodiment of the present disclosure, there is provided a rotating body, including: a shaft; an impeller having an insertion hole, which passes through the impeller in an axial direction of the shaft and is configured to receive one end side of the shaft inserted therethrough; an axial-end hole, which is formed in the shaft, is opened at one end of the shaft, and extends to a radially inner side of the insertion hole in the axial direction of the shaft; a radial-expansion member arranged in the axial-end hole; and a tubular wall portion, which forms the axial-end hole, and is configured to press an inner peripheral surface of the insertion hole.

The rotating body may include a cutout portion, which is formed in the tubular wall portion, and extends in the axial direction from the one end.

The radial-expansion member may have a tapered portion, which becomes thinner as extending toward a bottom portion of the axial-end hole and is configured to press an inner peripheral surface of the axial-end hole.

The radial-expansion member may have a threaded portion configured to be threadedly engaged with a thread groove formed on an inner peripheral surface of the axial-end hole.

The radial-expansion member may be a spherical body configured to press an inner peripheral surface of the axial-end hole.

The radial-expansion member may include an insertion receiving member having a hollow portion opened in the axial direction; an insertion member inserted through the hollow portion of the insertion receiving member; and an annular wall portion, which forms the hollow portion, and is configured to press an inner peripheral surface of the axial-end hole.

The rotating body may include an inclination portion, which is provided on at least one of an outer peripheral surface of the insertion member or an inner peripheral surface of the hollow portion, and is gradually increased in diameter as extending in the axial direction.

The insertion member may be a spherical body configured to press an inner peripheral surface of the hollow portion.

In order to achieve the above-mentioned object, according to one embodiment of the present disclosure, there is provided a turbocharger, including the rotating body described above.

Effects of Disclosure

According to the present disclosure, it is possible to easily mount the impeller to the shaft.

DESCRIPTION OF EMBODIMENT

Figure 1:
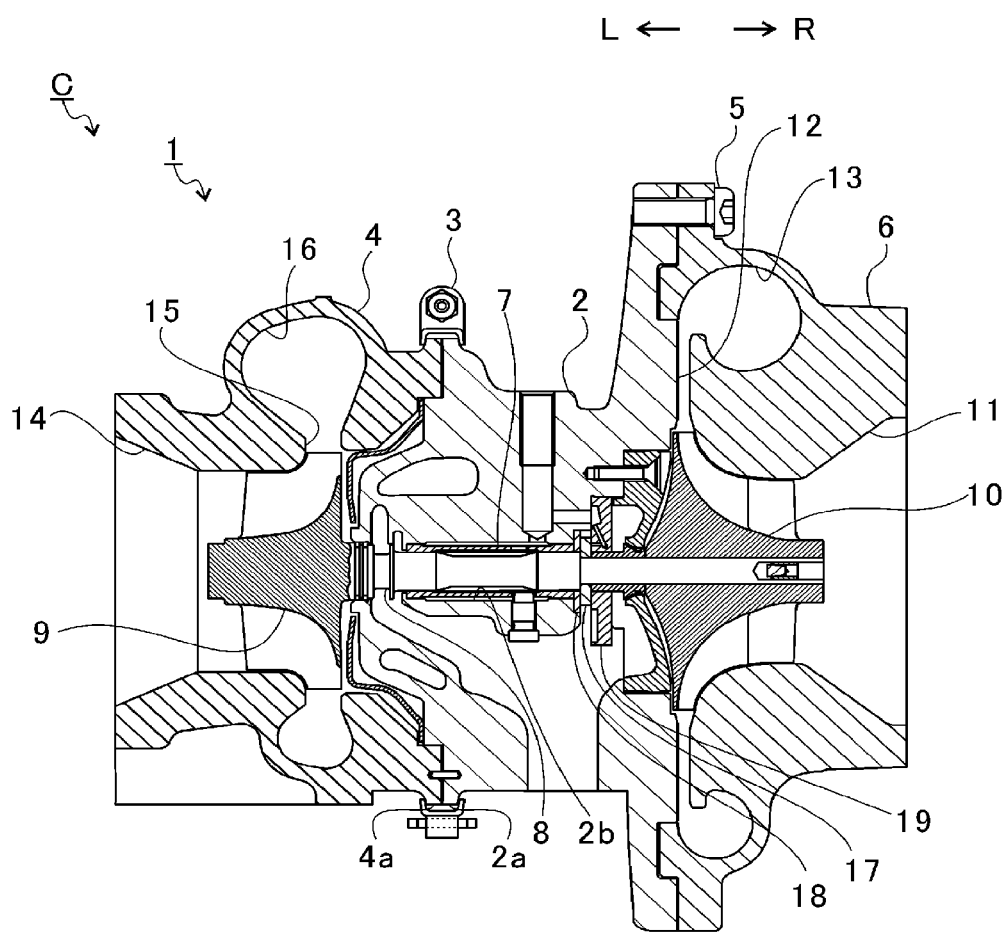
FIG. 1 is a schematic sectional view of a turbocharger.

Now, with reference to the attached drawings, one embodiment of the present disclosure is described in detail.

The dimensions, materials, and other specific numerical values represented in the embodiment are merely examples used for facilitating the understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C. The direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2. A turbine housing 4 is coupled to the bearing housing 2 on the left side by a fastening mechanism 3. A compressor housing 6 is coupled to the bearing housing 2 on the right side by a fastening bolt 5.

A protrusion 2a is provided on an outer peripheral surface of the bearing housing 2 in the vicinity of the turbine housing 4. The protrusion 2a projects in a radial direction of the bearing housing 2. A protrusion 4a is provided on an outer peripheral surface of the turbine housing 4 in the vicinity of the bearing housing 2. The protrusion 4a projects in a radial direction of the turbine housing 4. The fastening mechanism 3 is formed of a fastening band (G coupling). The fastening mechanism 3 is configured to sandwich the protrusions 2a and 4a.

The bearing housing 2 has a bearing hole 2b. The bearing hole 2b penetrates through the bearing housing 2 in a right-and-left direction of the turbocharger C. A bearing 7 (in FIG. 1, a semi-floating bearing is illustrated as an example) is provided in the bearing hole 2b. A shaft 8 is axially supported by the bearing 7. A turbine impeller 9 is provided at a left end portion (another end) of the shaft 8. The turbine impeller 9 is received in the turbine housing 4 so as to be rotatable. Moreover, a compressor impeller 10 (impeller) is provided at a right end portion (one end) of the shaft 8. The compressor impeller 10 is received in the compressor housing 6 so as to be rotatable.

The compressor housing 6 has a suction port 11. The suction port 11 is opened on the right side of the turbocharger C. The suction port 11 is connected to an air cleaner (not shown). Under a state in which the bearing housing 2 and the compressor housing 6 are coupled to each other by the fastening bolt 5, a diffuser flow passage 12 is formed. The diffuser flow passage 12 is formed by opposed surfaces of the bearing housing 2 and the compressor housing 6. The diffuser flow passage 12 increases pressure of air. The diffuser flow passage 12 is annularly formed so as to extend from an inner side toward an outer side in a radial direction of the shaft 8 (compressor impeller 10). The diffuser flow passage 12 communicates with the suction port 11 through intermediation of the compressor impeller 10.

The compressor housing 6 has a compressor scroll flow passage 13. The compressor scroll flow passage 13 has an annular shape. The compressor scroll flow passage 13 is located on a radially outer side of the shaft 8 (compressor impeller 10) with respect to the diffuser flow passage 12. The compressor scroll flow passage 13 communicates with a suction port of an engine (not shown). The compressor scroll flow passage 13 communicates also with the diffuser flow passage 12. Thus, when the compressor impeller 10 is rotated, air is sucked into the compressor housing 6 through the suction port 11. The sucked air is increased in speed by an action of a centrifugal force during a course of flowing through blades of the compressor impeller 10. The air increased in speed is increased in pressure in the diffuser flow passage 12 and the compressor scroll flow passage 13. The air increased in pressure is introduced to the suction port of the engine.

The turbine housing 4 has a discharge port 14. The discharge port 14 is opened on the left side of the turbocharger C. The discharge port 14 is connected to an exhaust gas purification device (not shown). A flow passage 15 and a turbine scroll flow passage 16 are formed in the turbine housing 4. The turbine scroll flow passage 16 has an annular shape. The turbine scroll flow passage 16 is located on an outer side in a radial direction of the shaft 8 (turbine impeller 9) with respect to the flow passage 15. The turbine scroll flow passage 16 communicates with a gas inflow port (not shown). Exhaust gas discharged from an exhaust gas manifold (not shown) of the engine is introduced to the gas inflow port. The turbine scroll flow passage 16 communicates with the flow passage 15. Thus, the exhaust gas introduced through the gas inflow port to the turbine scroll flow passage 16 is introduced to the discharge port 14 through the flow passage 15 and the turbine impeller 9. The exhaust gas introduced to the discharge port 14 causes the turbine impeller 9 to rotate during a course of flowing. Then, a rotational force of the turbine impeller 9 is transmitted to the compressor impeller 10 through the shaft 8. As described above, the air is increased in pressure due to the rotational force of the compressor impeller 10, and is introduced to the suction port of the engine.

Figure 2:
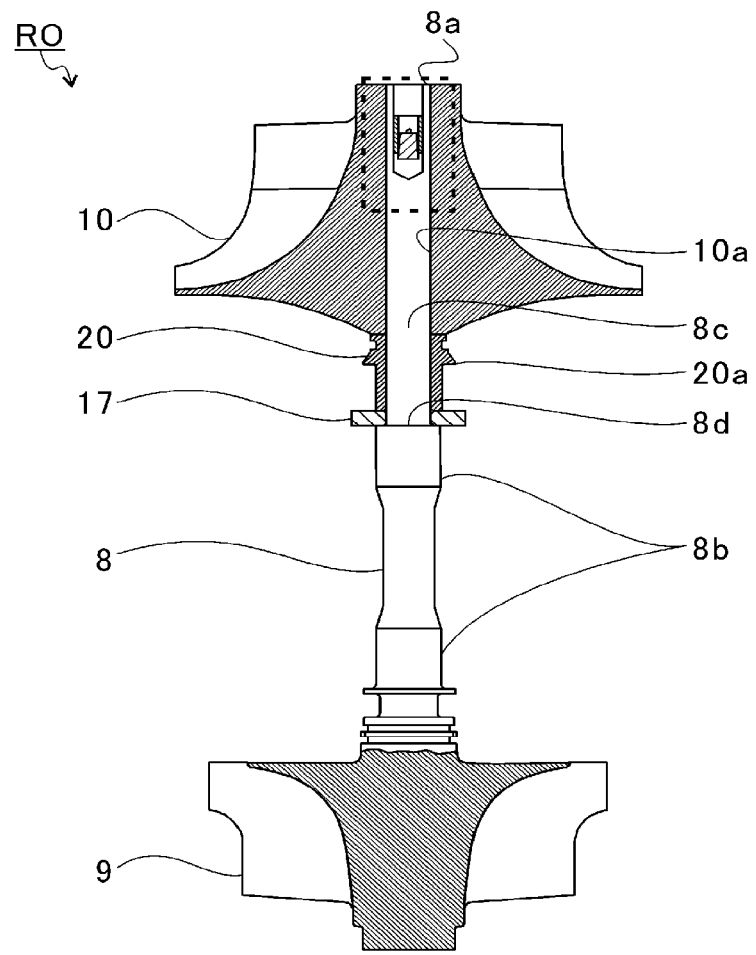
FIG. 2 is an extraction view of a rotating body.

FIG. 2 is an extraction view of a rotating body RO. In FIG. 2, the rotating body RO which is rotated counterclockwise by 90 degrees as compared to FIG. 1 is illustrated. The rotating body RO is formed of the shaft 8 and members which rotate integrally with the shaft 8. As illustrated in FIG. 2, the compressor impeller 10 is provided on one end 8a side of the shaft 8. The turbine impeller 9 is joined to another end side of the shaft 8. The compressor impeller 10 has an insertion hole 10a. The insertion hole 10a passes through the compressor impeller 10 in an axial direction of the shaft 8 (hereinafter simply referred to as "axial direction"). The one end 8a side of the shaft 8 is inserted through the insertion hole 10a.

The shaft 8 has large-diameter portions 8b and a small-diameter portion 8c. The large-diameter portions 8b are axially supported by the bearings 7. The small-diameter portion 8c is located more on the one end 8a side than the large-diameter portions 8b. An outer diameter of the small-diameter portion 8c is smaller than an outer diameter of the large-diameter portions 8b. The difference in outer diameter between the large-diameter portions 8b and the small-diameter portion 8c defines a step surface 8d on the shaft 8. The step surface 8d faces the compressor impeller 10 side.

A thrust collar 17 is arranged on the shaft 8 and is located more on the compressor impeller 10 side than the step surface 8d. The thrust collar 17 is an annular member. As illustrated in FIG. 1, the thrust collar 17 is sandwiched between two thrust bearings 18 and 19. A thrust load of the shaft 8 acts on the thrust bearings 18 and 19 through the thrust collar 17.

An oil thrower 20 is arranged between the thrust collar 17 and the compressor impeller 10. The oil thrower 20 has a protrusion 20a. The protrusion 20a projects radially outward. Lubricating oil having lubricated the thrust bearings 18 and 19 flows along the shaft 8 to reach the oil thrower 20. The protrusion 20a is configured to diffuse the lubricating oil, which has reached the oil thrower 20, radially outward. In such a manner, leakage of the lubricating oil toward the compressor impeller 10 side is suppressed.

In a state in which the shaft 8 is inserted therethrough, the thrust collar 17 and the oil thrower 20 are sandwiched between the step surface 8d of the shaft 8 and the compressor impeller 10. Specifically, the shaft 8 is inserted into the thrust collar 17 to such an extent that the thrust collar 17 is brought into abutment against the step surface 8d of the shaft 8. The shaft 8 is inserted into the oil thrower 20 to such an extent that the oil thrower 20 is brought into abutment against the thrust collar 17. Next, the shaft 8 is inserted into the compressor impeller 10 to such an extent that the compressor impeller 10 is brought into abutment against the oil thrower 20. After that, the compressor impeller 10 is mounted to the shaft 8.

Figure 3A:
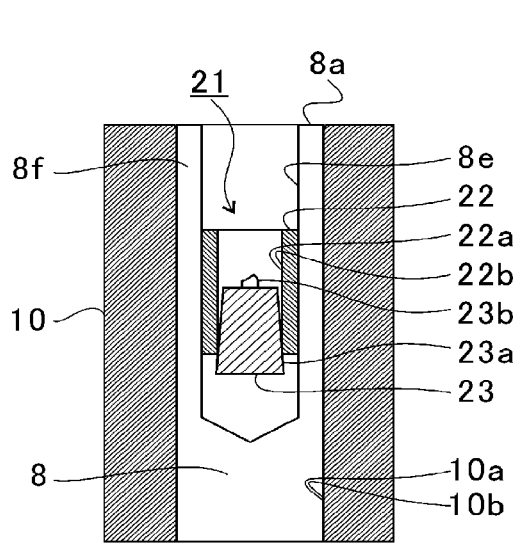
FIG. 3A is an enlarged view of the part indicated by the broken line in FIG. 2.

FIG. 3A is an enlarged view of the part indicated by the broken line in FIG. 2. As illustrated in FIG. 3A, an axial-end hole 8e is formed on the one end 8a side of the shaft 8. The axial-end hole 8e is opened at the one end 8a of the shaft 8.

The axial-end hole 8e extends in the axial direction of the shaft 8 to a radially inner side of the insertion hole 10a of the compressor impeller 10. A radial-expansion member 21 is arranged inside the axial-end hole 8e. The radial-expansion member 21 is inserted through (inserted into) the inside of the axial-end hole 8e. The radial-expansion member 21 includes an insertion receiving member 22 and an insertion member 23. The insertion receiving member 22 is a hollow annular member. A hollow portion 22a is formed inside the insertion receiving member 22. The hollow portion 22a is opened at both ends of the insertion receiving member 22 in the axial direction. The hollow portion 22a is, for example, a hole passing through the insertion receiving member 22 in the axial direction. An annular wall portion 22b is a part forming the hollow portion 22a in the insertion receiving member 22.

An inclination portion 23a is formed on an outer peripheral surface of the insertion member 23. An outer diameter of the inclination portion 23a gradually increases in the axial direction. The outer diameter of the inclination portion 23a becomes smaller as extending toward the one end 8a side of the shaft 8. The insertion member 23 has a truncated cone shape. One end side of the insertion member 23, on which the outer diameter is minimum, is inserted through the hollow portion 22a of the insertion receiving member 22. Another end side of the insertion member 23, on which the outer diameter is maximum, projects outward from the insertion receiving member 22. Moreover, the tubular wall portion 8f is a part forming the axial-end hole 8e in the shaft 8.

Figure 3B:
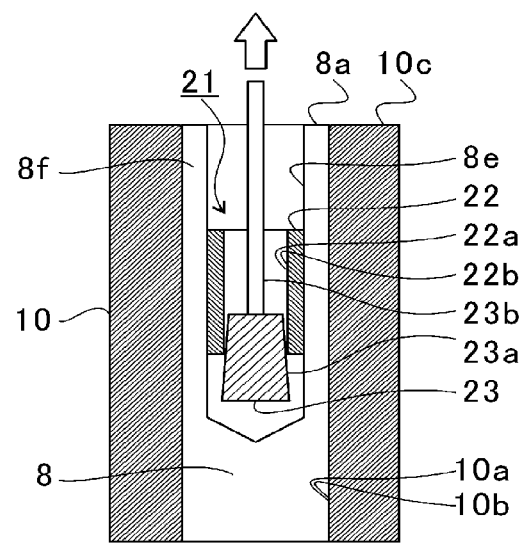
FIG. 3B is a sectional view of a part corresponding to FIG. 3A before a compressor impeller is mounted to a shaft.

FIG. 3B is a sectional view of a part corresponding to FIG. 3A before the compressor impeller 10 is mounted to the shaft 8. A projecting portion 23b is provided to the insertion member 23 illustrated in FIG. 3B. The projecting portion 23b projects from, for example, the one end 8a side of the shaft 8 in the hollow portion 22a. The projecting portion 23b projects from, for example, the axial-end hole 8e.

A width of the projecting portion 23b in the radial direction of the shaft 8 is smaller than that of the inclination portion 23a of the insertion member 23. The projecting portion 23b is formed to be thinner and longer than the inclination portion 23a. The projecting portion 23b is pulled from the another end side toward the one end 8a side of the shaft 8 (in the direction indicated by the outlined arrow in FIG. 3B). Then, a tensile load acts on the insertion member 23 in the direction in which the insertion member 23 is inserted through the hollow portion 22a. When the tensile load exceeds the critical stress of the projecting portion 23b to break the projecting portion 23b, the state illustrated in FIG. 3A is brought about.

In this process, the insertion member 23 is further inserted through the hollow portion 22a of the insertion receiving member 22 while spreading the annular wall portion 22b of the insertion receiving member 22 radially outward. When the annular wall portion 22b is spread radially outward, the annular wall portion 22b is fixed (for example, press-fitted) to an inner peripheral surface of the axial-end hole 8e (tubular wall portion 8f). The insertion receiving member 22 presses the tubular wall portion 8f radially outward. In such a manner, the radial-expansion member 21 presses the tubular wall portion 8f radially outward to radially expand the tubular wall portion 8f. When the tubular wall portion 8f is expanded radially outward, the tubular wall portion 8f is fixed to an inner peripheral surface 10b of the insertion hole 10a. Accordingly, the compressor impeller 10 is mounted to the shaft 8.

Moreover, when the projecting portion 23b is pulled in the direction indicated by the outlined arrow illustrated in FIG. 3B as described above, a load acts on the compressor impeller 10 in a direction opposite to the direction of the tensile load acting on the projecting portion 23b. An opening surface 10c is a surface of the compressor impeller 10 in which the insertion hole 10a is opened. The opening surface 10c is located on the one end 8a side of the shaft 8. For example, the projecting portion 23b is pulled while the opening surface 10c is pressed with a jig (not shown). Accordingly, a gap defined among the step surface 8d, the thrust collar 17, the oil thrower 20, and the compressor impeller 10 is suppressed. Rotational displacement of the thrust collar 17 and the oil thrower 20 is suppressed.

Figure 4:
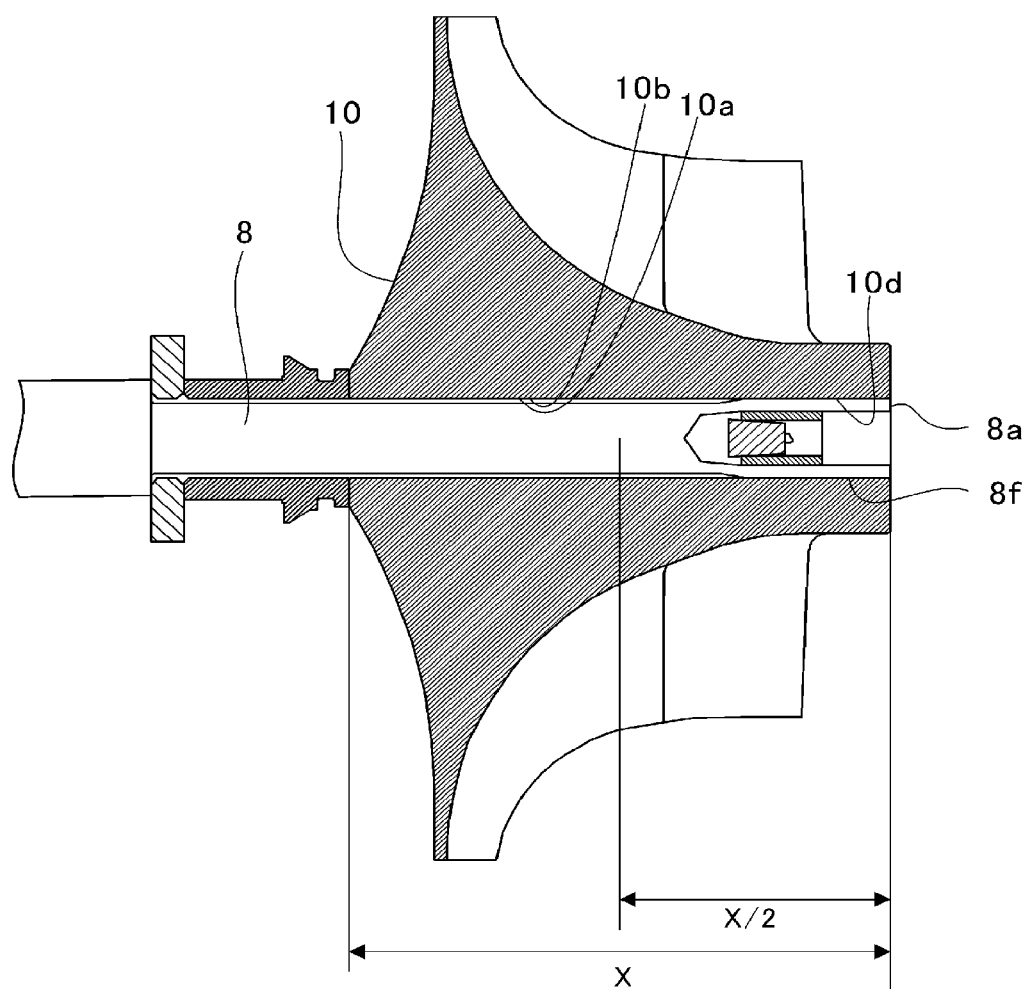
FIG. 4 is an illustration of a part of a tubular wall portion fixed to an insertion hole.

FIG. 4 is an illustration of a part of the tubular wall portion 8f fixed to the insertion hole 10a. As illustrated in FIG. 4, the tubular wall portion 8f is fixed at a fixing portion 10d of the inner peripheral surface 10b of the insertion hole 10a. Here, a total length of the compressor impeller 10 in the axial direction is represented by X. The fixing portion 10d is located more on the one end 8a side of the shaft 8 than a position apart from the one end 8a by a length corresponding to X/2 in the axial direction in the insertion hole 10a.

At the time of the operation of the turbocharger C, an inner diameter of the insertion hole 10a is slightly increased by the centrifugal force. A magnitude of the increase in diameter of the insertion hole 10a is smaller on the one end 8a side of the shaft 8 than on the another end side. With the fixing portion 10d located on the one end 8a side of the shaft 8, reduction in the force for fixing the shaft 8 and the compressor impeller 10 is suppressed.

Moreover, the amount of deformation of the tubular wall portion 8f falls within the range of elastic deformation of the tubular wall portion 8f. With this, at the time of the operation of the turbocharger C, even when the insertion hole 10a is radially expanded by the centrifugal force, the tubular wall portion 8f follows the radial expansion of the insertion hole 10a to radially expand. The fixed state of the tubular wall portion 8f and the inner peripheral surface 10b can be maintained. However, the amount of deformation of the tubular wall portion 8f may be larger than the range of the elastic deformation of the tubular wall portion 8f.

Figure 5A:
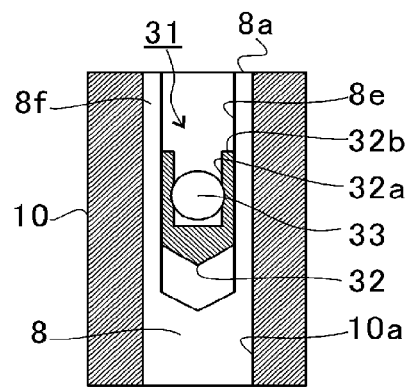
FIG. 5A is an explanatory view for illustrating a first modification example.

FIG. 5A is an explanatory view for illustrating a first modification example. An insertion receiving member 32 of a radial-expansion member 31 in the first modification example is a hollow annular member. One end of the insertion receiving member 32 in the axial direction is opened, and another end thereof is closed. A hollow portion 32a is formed inside the insertion receiving member 32. The hollow portion 32a is a hole having a bottom. The annular wall portion 32b is an annular part forming the hollow portion 32a in the insertion receiving member 32. The insertion member 33 is a spherical body. A diameter of the insertion member 33 is slightly larger than an inner diameter of the hollow portion 32a of the insertion receiving member 32 given before the insertion member 33 is inserted.

The insertion member 33 is inserted through the hollow portion 32a of the insertion receiving member 32 while spreading the insertion receiving member 32 radially outward. The insertion member 33 presses an inner peripheral surface of the hollow portion 32a. The annular wall portion 32b fixes the inner peripheral surface of the axial-end hole 8e. In such a manner, the radial-expansion member 31 presses the tubular wall portion 8f radially outward to radially expand the tubular wall portion 8f.

Figure 5B:
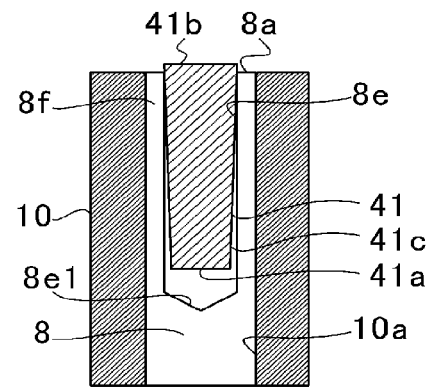
FIG. 5B is an explanatory view for illustrating a second modification example.

FIG. 5B is an explanatory view for illustrating a second modification example. A radial-expansion member 41 in the second modification example has a truncated cone shape. A distal end portion 41a of the radial-expansion member 41 has a minimum outer diameter in the radial-expansion member 41. The outer diameter of the distal end portion 41a is smaller than the inner diameter of the axial-end hole 8e. A base end portion 41b of the radial-expansion member 41 has a maximum outer diameter in the radial-expansion member 41. The outer diameter of the base end portion 41b is larger than the inner diameter of the axial-end hole 8e. Accordingly, the radial-expansion member 41 has a tapered portion 41c. The tapered portion 41c becomes thinner as extending toward a bottom portion 8e1 of the axial-end hole 8e. The radial-expansion member 41 is inserted through the axial-end hole 8e with the distal end portion 41a being a leading end. The tapered portion 41c of the radial-expansion member 41 presses the inner peripheral surface of the axial-end hole 8e. In such a manner, the tapered portion 41c presses the tubular wall portion 8f radially outward to radially expand the tubular wall portion 8f.

Figure 5C:
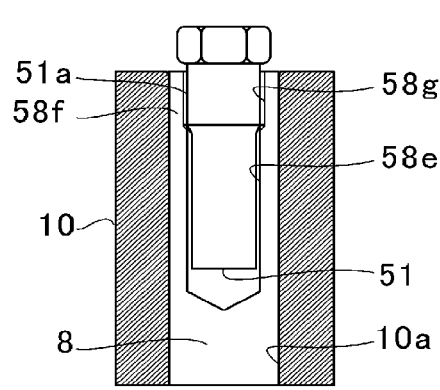
FIG. 5C is an explanatory view for illustrating a third modification example.

FIG. 5C is an explanatory view for illustrating a third modification example. In the third modification example, a radial-expansion member 51 is formed of, for example, a bolt. A thread groove 58g is formed in an inner peripheral surface of an axial-end hole 58e. The thread groove 58g is threadedly engaged with a threaded portion 51a of the radial-expansion member 51. An effective diameter of the threaded portion 51a of the radial-expansion member 51 is slightly larger than an effective diameter of the thread groove 58g of the axial-end hole 58e. When the radial-expansion member 51 is inserted through the axial-end hole 58e while the threaded portion 51a is threadedly engaged with the thread groove 58g, the radial-expansion member 51 presses the tubular wall portion 58f radially outward to radially expand the tubular wall portion 58f.

Figure 5D:
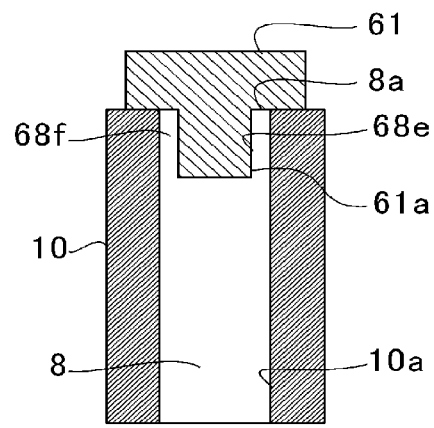
FIG. 5D is an explanatory view for illustrating a fourth modification example.

FIG. 5D is an explanatory view for illustrating a fourth modification example. In the fourth modification example, the radial-expansion member 61 is formed of, for example, a rivet. An axial-end hole 68e is formed in the radial-expansion member 61 in advance at the one end 8a of the shaft 8. A projecting portion 61a of the radial-expansion member 61 is driven into the axial-end hole 68e. An inner diameter of the axial-end hole 68e given before the projecting portion 61a is driven into the axial-end hole 68e is smaller than an outer diameter of the projecting portion 61a. When the projecting portion 61a is driven into the axial-end hole 68e, the radial-expansion member 61 presses the tubular wall portion 68f radially outward to radially expand the tubular wall portion 68f.

Figure 6A:
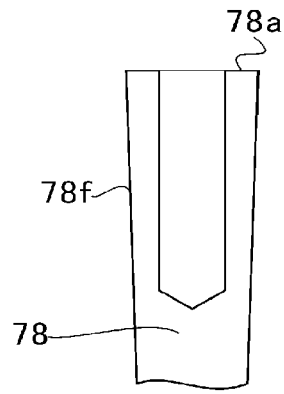
FIG. 6A, FIG. 6B, and FIG. 6C are explanatory views for illustrating a fifth modification example.
Figure 6B:
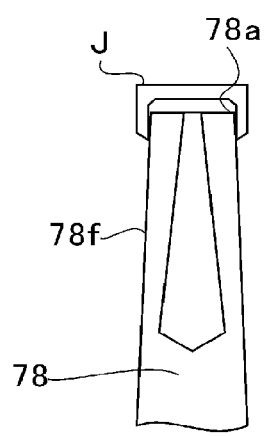
Figure 6C:
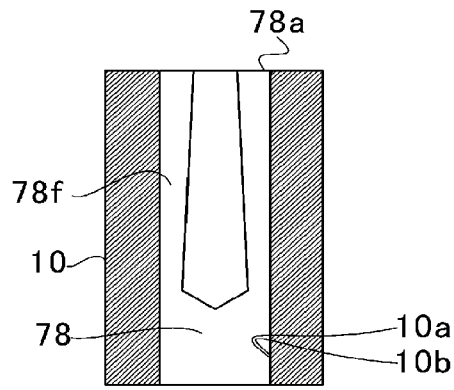

FIG. 6A, FIG. 6B, and FIG. 6C are explanatory views for illustrating a fifth modification example. As illustrated in FIG. 6A, in the fifth modification example, a tubular wall portion 78f of a shaft 78 has a tapered shape. An outer diameter of the tubular wall portion 78f gradually increases from another end side toward one end 78a side. Before the shaft 78 is inserted through the insertion hole 10a, under a state in which a load does not act, an outer diameter of the one end 78a of the shaft 78 is larger than an inner diameter of the insertion hole 10a.

As illustrated in FIG. 6B, an outer diameter of the tubular wall portion 78f on the one end 78a side is reduced by a jig J within the range of the elastic deformation. The tubular wall portion 78f receives a load acting radially inward from the jig J. The outer diameter of the tubular wall portion 78f on the one end 78a side becomes smaller than the inner diameter of the insertion hole 10a. An outer diameter of the jig J is, for example, smaller than the inner diameter of the insertion hole 10a.

In this state, as illustrated in FIG. 6C, the shaft 78 is inserted through the insertion hole 10a of the compressor impeller 10. After that, the jig J is removed. The tubular wall portion 78f of the shaft 78 is fixed to the inner peripheral surface 10b of the insertion hole 10a by an elastic force.

Figure 6D:
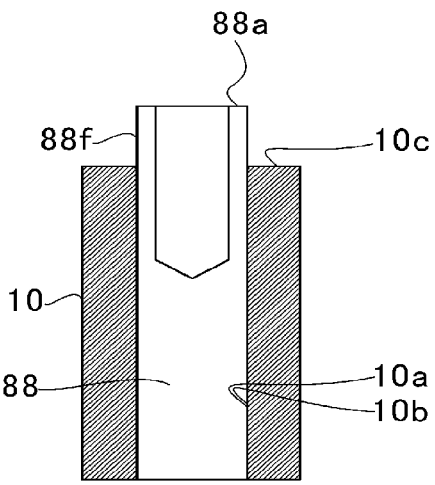
FIG. 6D and FIG. 6E are explanatory views for illustrating a sixth modification example.
Figure 6E:
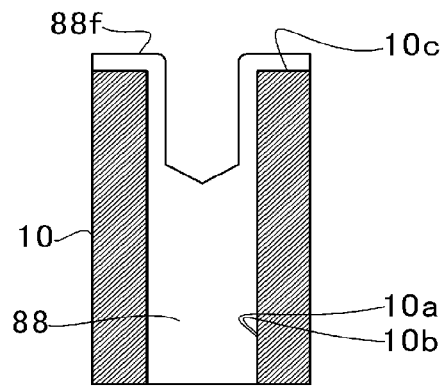

FIG. 6D and FIG. 6E are explanatory views for illustrating a sixth modification example. As illustrated in FIG. 6D, the insertion hole 10a is opened in the opening surface 10c of the compressor impeller 10. Under a state in which a shaft 88 is inserted through the insertion hole 10a of the compressor impeller 10, one end 88a of the shaft 88 projects from the insertion hole 10a. As illustrated in FIG. 6E, a tubular wall portion 88f of the shaft 88 is spread by, for example, a jig (not shown) so as to extend along the opening surface 10c. In such a manner, the tubular wall portion 88f is fixed to the inner peripheral surface 10b of the insertion hole 10a.

Figure 7A:
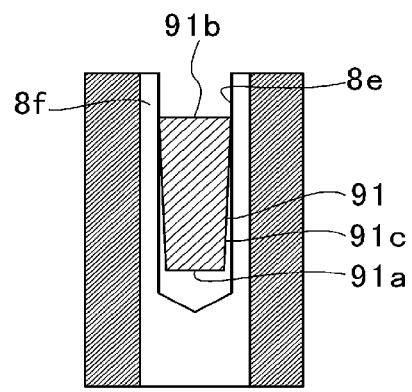
FIG. 7A is an explanatory view for illustrating a seventh modification example.

FIG. 7A is an explanatory view for illustrating a seventh modification example. A radial-expansion member 91 in the seventh modification example has a truncated cone shape similar to that of the second modification example. In the second modification example illustrated in FIG. 5B, the outer diameter of the base end portion 41b is larger than the inner diameter of the axial-end hole 8e, and the base end portion 41b projects from the axial-end hole 8e. In the seventh modification example, a base end portion 91b of the radial-expansion member 91 is located inside the axial-end hole 8e. The entirety of the radial-expansion member 91 is inserted through the axial-end hole 8e. An outer diameter of the base end portion 91b is slightly larger than the inner diameter of the axial-end hole 8e given before the radial-expansion member 91 is inserted through the axial-end hole 8e. Therefore, when the radial-expansion member 91 is inserted through the axial-end hole 8e with the distal end portion 91a being a leading end, a tapered portion 91c of the radial-expansion member 91 presses the inner peripheral surface of the axial-end hole 8e. In such a manner, the tapered portion 91c presses the tubular wall portion 8f radially outward to radially expand the tubular wall portion 8f.

Figure 7B:
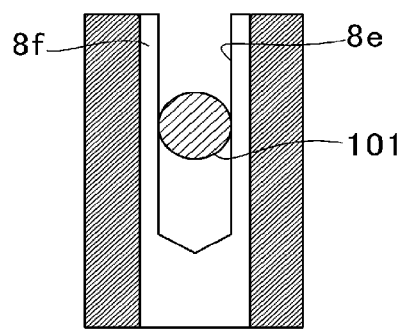
FIG. 7B is an explanatory view for illustrating an eighth modification example.

FIG. 7B is an explanatory view for illustrating an eighth modification example. A radial-expansion member 101 in the eighth modification example is a spherical body. A diameter of the radial-expansion member 101 is slightly larger than the inner diameter of the axial-end hole 8e given before the radial-expansion member 101 is inserted. The radial-expansion member 101 is inserted through the axial-end hole 8e while spreading the axial-end hole 8e radially outward. The radial-expansion member 101 presses the inner peripheral surface of the axial-end hole 8e. In such a manner, the radial-expansion member 101 presses the tubular wall portion 8f radially outward to radially expand the tubular wall portion 8f.

Figure 7C:
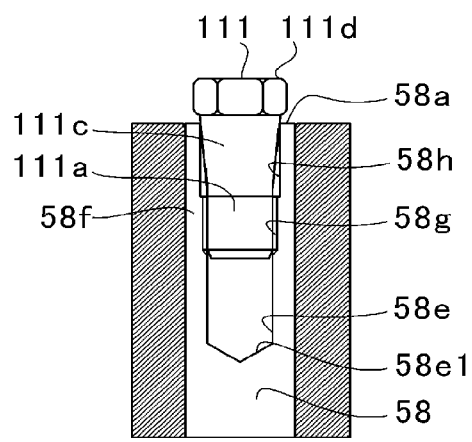
FIG. 7C is an explanatory view for illustrating a ninth modification example.

FIG. 7C is an explanatory view for illustrating a ninth modification example. In the ninth modification example, a radial-expansion member 111 is formed of a bolt similarly to the fourth modification example. The radial-expansion member 111 in the ninth modification example has a tapered portion 111c, unlike the radial-expansion member 51 in the fourth modification example. The tapered portion 111c becomes thinner as extending toward a bottom portion 58e1 of the axial-end hole 58e formed at one end 58a of the shaft 58. A threaded portion 111a of the radial-expansion member 111 is located more on the bottom portion 58e1 side of the axial-end hole 58e than the tapered portion 111c.

A large-inner-diameter portion 58h is formed on an inner peripheral surface of the axial-end hole 58e. An inner diameter of the large-inner-diameter portion 58h is larger than an inner diameter of the thread groove 58g. The inner diameter of the large-inner-diameter portion 58h given before the radial-expansion member 111 is inserted is slightly smaller than an outer diameter of the tapered portion 111c on a head portion 111d side of the radial-expansion member 111. The thread groove 58g of the axial-end hole 58e is located more on the bottom portion 58e1 side of the axial-end hole 58e than the large-inner-diameter portion 58h.

When the radial-expansion member 111 is inserted through the axial-end hole 58e while the threaded portion 111a is threadedly engaged with the thread groove 58g, the tapered portion 111c of the radial-expansion member 111 presses the inner peripheral surface of the large-inner-diameter portion 58h. In such a manner, the tapered portion 111c presses the tubular wall portion 58f radially outward to radially expand the tubular wall portion 58f.

Figure 8A:
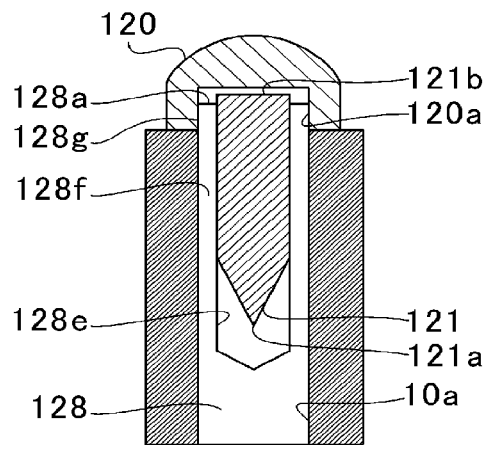
FIG. 8A and FIG. 8B are explanatory views for illustrating a tenth modification example.
Figure 8B:
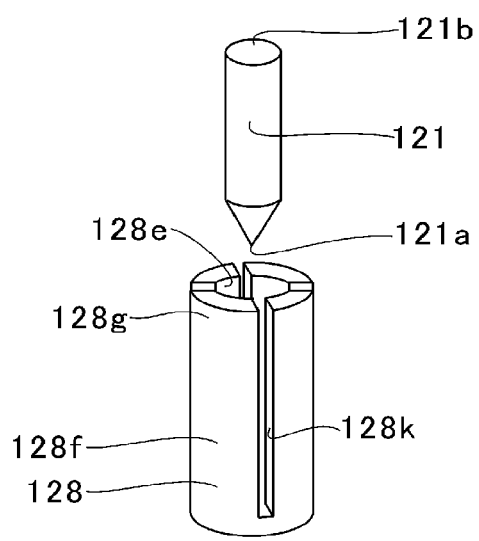

FIG. 8A and FIG. 8B are explanatory views for illustrating a tenth modification example. In the tenth modification example, the radial-expansion member 121 has a wedge shape. A distal end portion 121a of a radial-expansion member 121 is inserted through an axial-end hole 128e. A base end portion 121b of the radial-expansion member 121 projects from the axial-end hole 128e. However, the radial-expansion member 121 may be inserted through the axial-end hole 128e to such an extent that the base end portion 121b is placed in the axial-end hole 128e.

A threaded portion 128g is formed on an outer peripheral surface of a tubular wall portion 128f of the shaft 128. The threaded portion 128g projects from the insertion hole 10a. A protection member 120 is provided at one end 128a of the shaft 128. The protection member 120 is formed of, for example, a nut such as a cap nut. The protection member 120 has a threaded hole 120a having a bottom. The threaded hole 120a is threadedly engaged with the threaded portion 128g of the shaft 128. When the protection member 120 is mounted to the shaft 128, the shaft 128 and the radial-expansion member 121 are not exposed, thereby suppressing oxidation. Moreover, with the use of the protection member 120, the radial-expansion member 121 is prevented from dropping off.

As illustrated in FIG. 8B, cutout portions 128k are formed in the tubular wall portion 128f of the shaft 128. The cutout portions 128k extend in the axial direction from the one end 128a. A plurality of cutout portions 128k are formed, and are arranged, for example, apart from each other at equal intervals in a circumferential direction of the shaft 128. However, the cutout portions 128k may be arranged at uneven intervals in the circumferential direction of the shaft 128. Only one cutout portion 128k may be formed.

With the cutout portions 128k being formed, the tubular wall portion 128f can easily be deformed when the radial-expansion member 121 is inserted therethrough. Therefore, the stress generated in the shaft 128 along with the deformation of the tubular wall portion 128f is suppressed.

Figure 9:
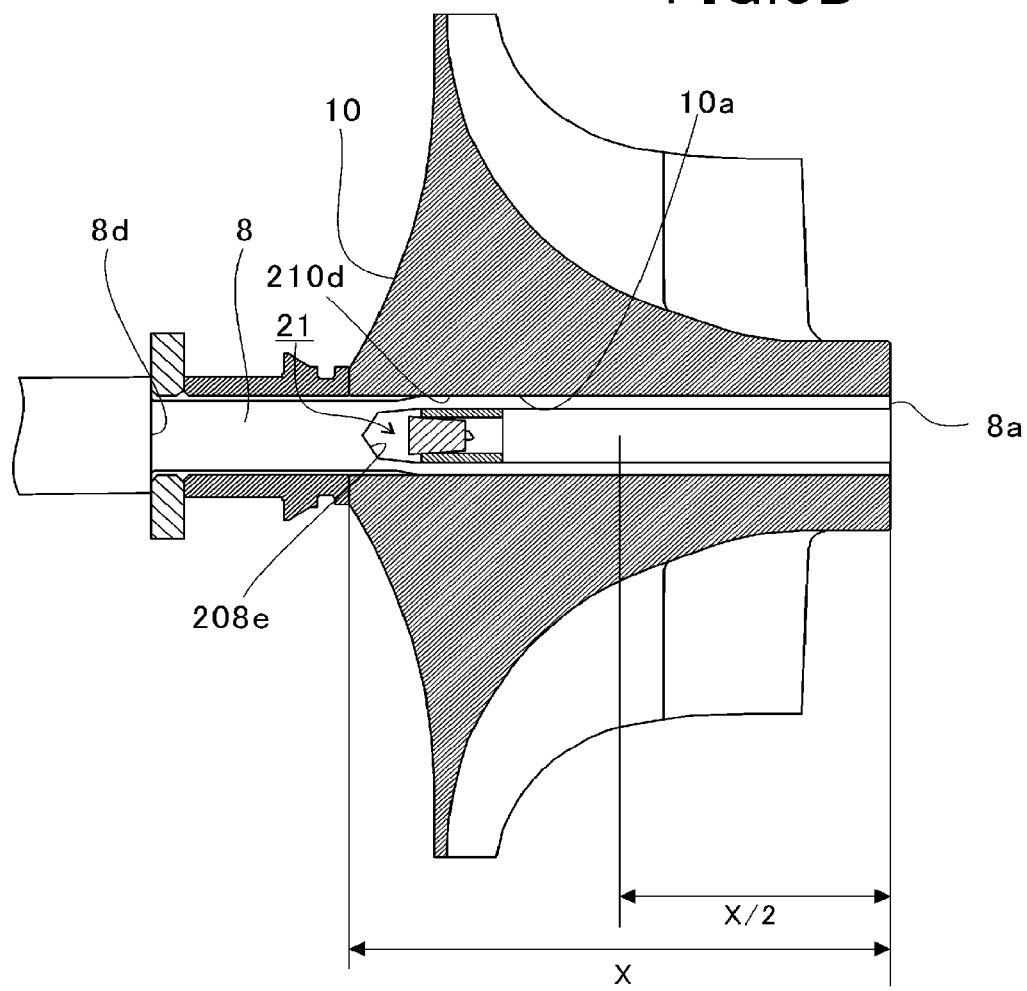
FIG. 9 is an explanatory view for illustrating an eleventh modification example.

FIG. 9 is an explanatory view for illustrating an eleventh modification example. In the eleventh modification example, the radial-expansion member 21, which is the same as that given in the above-mentioned embodiment, is provided.

An axial-end hole 208e in the eleventh modification example is formed to be deeper than that given in the above-mentioned embodiment. The axial-end hole 208e extends to the side more apart from the one end 8a of the shaft 8 (left side of FIG. 9, or the step surface 8d side) than the position apart from the one end 8a by the length corresponding to X/2 in the axial direction in the insertion hole 10a.

A fixing portion 210d in the eleventh modification example is more apart from the one end 8a of the shaft 8 than the fixing portion 10d given in the above-mentioned embodiment. The fixing portion 210d is located on the side more apart from the one end 8a of the shaft 8 (left side of FIG. 9, or the step surface 8d side) than the position apart from the one end 8a by the length corresponding to X/2 in the axial direction in the insertion hole 10a.

As described above, in the above-mentioned embodiment and modification examples, the tubular wall portion 8f, 58f, 68f, 78f, 88f is pressed against the inner peripheral surface 10h of the insertion hole 10a so that the compressor impeller 10 is mounted to the shaft 8, 58, 78, 88. Therefore, there is no need to manage the axial force. The compressor impeller 10 can easily be mounted to the shaft 8, 58, 78, 88.

Moreover, in the above-mentioned embodiment and first to fourth and seventh to eleventh modification examples, the radial-expansion member 21, 31, 41, 51, 61, 91, 101, 111, 121 is provided, thereby being capable of mounting the compressor impeller 10 to the shaft 8, 58, 128 in a simpler and easier manner.

Moreover, in the above-mentioned embodiment and first modification example, description is made of the case in which the radial-expansion member 21, 31 is formed of the insertion receiving member 22, 32 and the insertion member 23, 33. In this case, when the load is applied to the insertion member 23, 33 in the axial direction to radially expand the tubular wall portion 8f, friction is scarcely generated on the inner peripheral surface of the axial-end hole 8e of the shaft 8. Wear of the shaft 8 is suppressed, thereby being capable of improving durability.

One embodiment of the present disclosure has been described above with reference to the attached drawings, but, needless to say, the present disclosure is not limited to the embodiment described above. It is apparent that those skilled in the art may arrive at various alternations and modifications within the scope of claims, and those examples are construed as naturally falling within the technical scope of the present disclosure.

For example, in the above-mentioned embodiment, description is made of the case in which the inclination portion 23a is provided on the outer peripheral surface of the insertion member 23. However, an inclination portion may be provided on the inner peripheral surface of the hollow portion 22a of the insertion receiving member 22. In this case, the inner diameter of the inclination portion 23a becomes smaller, for example, as extending toward the one end 8a side of the shaft 8. Moreover, the inclination portion 23a may be formed on both the outer peripheral surface of the insertion member 23 and the inner peripheral surface of the hollow portion 22a. Moreover, in the above-mentioned first modification example, an inclination portion may be formed on the inner peripheral surface of the hollow portion 32a (annular wall portion 32b). In this case, the insertion member 33 is inserted in a direction opposite to the direction of inserting the insertion member 23, and hence an inner diameter of the inclination portion becomes larger as extending toward the one end 8a side of the shaft 8. As described above, the direction of the inclination of the inclination portion is set in accordance with the direction in which the insertion member 23, 33 is inserted. In any case, the increase in diameter in accordance with the amount of movement of the insertion member 23 can appropriately be adjusted by the inclination portion 23a. Moreover, a large contact area between the insertion receiving member 22 and the insertion member 23 is secured. Local deformation of the shaft 8 can be suppressed.

Moreover, in the above-mentioned embodiment, description is made of the case in which the projecting portion 23b is provided, but the projecting portion 23b is not essentially required. However, the following effect can be obtained with the configuration of causing the tensile load to act on the insertion member 23 by pulling the projecting portion 23b. That is, through adjustment of the load that causes breakage of the projecting portion 23b, the tensile load caused to act on the insertion member 23 can easily be adjusted.

Moreover, in the above-mentioned first modification example, description is made of the case in which the insertion member 33 is formed of the spherical body, but the insertion member 33 is not limited to the spherical body. However, with the insertion member 33 formed of the spherical body, the friction against the insertion receiving member 32 can be suppressed. A large magnitude of radial expansion of the insertion receiving member 32 can be secured with a smaller load.

Moreover, with the configuration including no radial-expansion member 21, 31, 41, 51, 61 as in the above-mentioned fifth modification example and sixth modification example, reduction in weight can be achieved. In particular, in the fifth modification example, through the adjustment of a magnitude of reduction in diameter with the use of the jig J, a large elastic force of the shaft 78 can be secured. As the configuration including no radial-expansion member 21, 31, 41, 51, 61, the compressor impeller 10 can be mounted to the shaft 78 in a relatively rigid manner.

Moreover, in the above-mentioned embodiment and modification examples other than the tenth modification example, description is made of the case in which the radial-expansion member 21, 31, 41, 51, 61, 91, 101, 111, 121 and the one end 8a, 58a, 78a, 88a of the shaft 8, 58, 78, 88 are exposed. However, coating for improving corrosion resistance may be applied to the exposed portions. The corrosion may be suppressed through the arrangement of the protection member 120 configured to cover the exposed portion as in the tenth modification example.

Moreover, in the above-mentioned embodiment, description is made of the case in which, when the projecting portion 23b is pulled in the direction indicated by the outlined arrow illustrated in FIG. 3B as described above, the load acts on the compressor impeller 10 in the direction opposite to the direction of the tensile load acting on the projecting portion 23b. This can be applied to other modification examples. That is, similarly to the above-mentioned embodiment, also in other modification examples, the operation of mounting the compressor impeller 10 may be performed while causing the load to act on the compressor impeller 10 toward the step surface 8d side.

Moreover, in the above-mentioned tenth modification example, description is made of the case in which the cutout portions 128k are formed in the tubular wall portion 128f of the shaft 128. This can be applied also to other embodiments and modification examples.

Moreover, in the above-mentioned eleventh modification example, description is made of the case in which the fixing portion 210d is located on the side more apart from the one end 8a of the shaft 8 than the position apart from the one end 8a by the length corresponding to X/2 in the axial direction in the insertion hole 10a. This can be applied also to other embodiments and modification examples.

INDUSTRIAL APPLICABILITY

The present disclosure is applicable to a rotating body and to a turbocharger.

What is claimed is:
1. A rotating body, comprising:
a shaft;
an impeller having an insertion hole, which passes through the impeller in an axial direction of the shaft, and is configured to receive one end side of the shaft inserted therethrough;
an axial-end hole, which is formed in the shaft, is opened at one end of the shaft, and extends to a radially inner side of the insertion hole in the axial direction of the shaft;
a radial-expansion member arranged in the axial-end hole; and
a tubular wall portion, which forms the axial-end hole, and is configured to press an inner peripheral surface of the insertion hole,
wherein the radial-expansion member includes a threaded portion configured to be threadedly engaged with a thread groove formed on an inner peripheral surface of the axial-end hole.
2. The rotating body according to claim 1, further comprising a cutout portion, which is formed in the tubular wall portion, and extends in the axial direction from the one end.
3. The rotating body according to claim 2, wherein the radial-expansion member has a tapered portion, which becomes thinner as extending toward a bottom portion of the axial-end hole and is configured to press an inner peripheral surface of the axial-end hole.
4. The rotating body according to claim 1, wherein the radial-expansion member has a tapered portion, which becomes thinner as extending toward a bottom portion of the axial-end hole and is configured to press an inner peripheral surface of the axial-end hole.
5. The rotating body according to claim 1, wherein an effective diameter of the threaded portion is larger than an effective diameter of the thread groove.

* * * * *